(12) United States Patent
Bordogna et al.

(10) Patent No.: US 7,813,285 B2
(45) Date of Patent: Oct. 12, 2010

(54) METHOD FOR PER-PORT FLOW CONTROL OF PACKETS AGGREGATED FROM MULTIPLE LOGICAL PORTS OVER A TRANSPORT LINK

(75) Inventors: Mark A. Bordogna, Andover, MA (US); Sundararajan Cidambara, Andover, MA (US); Adam B. Healey, Newburyport, MA (US)

(73) Assignee: Agere Systems Inc., Allentown, PA (US)

( * ) Notice: Subject to any disclaimer, the term of this patent is extended or adjusted under 35 U.S.C. 154(b) by 77 days.

(21) Appl. No.: 12/184,331

(22) Filed: Aug. 1, 2008

(65) Prior Publication Data

US 2008/0291832 A1 Nov. 27, 2008

Related U.S. Application Data

(63) Continuation of application No. 10/285,221, filed on Oct. 31, 2002, now abandoned.

(51) Int. Cl.
*H04J 1/16* (2006.01)

(52) U.S. Cl. .................. 370/236; 370/252; 370/397

(58) Field of Classification Search .......... 370/232, 370/234, 235, 237, 238.1, 252, 395.3, 395.52, 370/395.53, 397, 401, 539, 236; 709/231, 709/232, 233, 234, 235
See application file for complete search history.

(56) References Cited

U.S. PATENT DOCUMENTS

| | | | |
|---|---|---|---|
| 5,490,141 A | 2/1996 | Lai et al. | |
| 5,847,751 A | 12/1998 | Safadi | |
| 5,999,518 A | 12/1999 | Nattkemper et al. | |
| 6,628,657 B1 | 9/2003 | Manchester et al. | |
| 6,934,301 B2 | 8/2005 | Jordan | |
| 6,947,380 B1 * | 9/2005 | Yip et al. | 370/230 |
| 6,981,054 B1 * | 12/2005 | Krishna | 709/235 |
| 6,985,488 B2 * | 1/2006 | Pan et al. | 370/395.3 |
| 7,298,694 B2 * | 11/2007 | Kamiya et al. | 370/218 |
| 7,369,551 B2 * | 5/2008 | He et al. | 370/389 |

(Continued)

OTHER PUBLICATIONS

Scholten et al., "Data Transport Applications Using GFP," IEEE Communications Magazine, pp. 96-101 (May 2002).

(Continued)

*Primary Examiner*—Chi H. Pham
*Assistant Examiner*—Kevin Mew
(74) *Attorney, Agent, or Firm*—Ryan, Mason & Lewis, LLP

(57) ABSTRACT

A method is disclosed for controlling the flow of packets aggregated from multiple logical ports over a transport link. A directed flow control indicator is provided to the transmitting end station that causes a detected congestion condition. The directed flow control indicator causes the transmitting end station to suspend the transmission of further packets. The linear expansion header of the Generic Framing Procedure (GFP) linear mapping scheme is extended to include the flow control indicator, such as a bit indicating a potential overload condition. A directed flow control indication can be provided in one or more packets sent to the transmitting end station over the transport network without increasing the network overhead. If packets are not being sent to the appropriate transmitting end station, a packet generator can generate one or more packets with the flow control indicator to inform the appropriate transmitting end station of the congestion condition.

19 Claims, 3 Drawing Sheets

U.S. PATENT DOCUMENTS

| | | |
|---|---|---|
| 7,417,950 B2 * | 8/2008 | Hofmeister et al. .......... 370/230 |
| 7,492,714 B1 * | 2/2009 | Liao et al. .................... 370/235 |
| 7,583,599 B1 * | 9/2009 | Ling et al. ................... 370/235 |
| 7,583,664 B2 * | 9/2009 | Ho et al. ...................... 370/386 |
| 7,593,327 B2 * | 9/2009 | Bordogna et al. ........... 370/230 |
| 2002/0176450 A1 * | 11/2002 | Kong et al. .................. 370/539 |
| 2003/0016697 A1 | 1/2003 | Jordan |
| 2003/0074449 A1 | 4/2003 | Smith et al. |
| 2003/0218977 A1 * | 11/2003 | Pan et al. ..................... 370/230 |
| 2003/0218981 A1 | 11/2003 | Scholten |
| 2004/0054776 A1 | 3/2004 | Klotz et al. |
| 2004/0059807 A1 | 3/2004 | Klotz et al. |
| 2004/0085902 A1 * | 5/2004 | Miller et al. ................. 370/235 |
| 2005/0157648 A1 * | 7/2005 | Miller et al. ................. 370/235 |
| 2006/0155938 A1 * | 7/2006 | Cummings et al. .......... 711/149 |

OTHER PUBLICATIONS

Seifert, R., "Ethernet Flow Control: The Need for Flow Control in Ethernet," Gigabit Ethernet: Technology and Applications for High-Speed LANs, 89-111 (1998).

"Virtual Channel Identifier," Virtual Channel Identifier, http://en.wikipedia.org/wiki/virtual_channel_identifier, downloaded on Nov. 15, 2007.

* cited by examiner

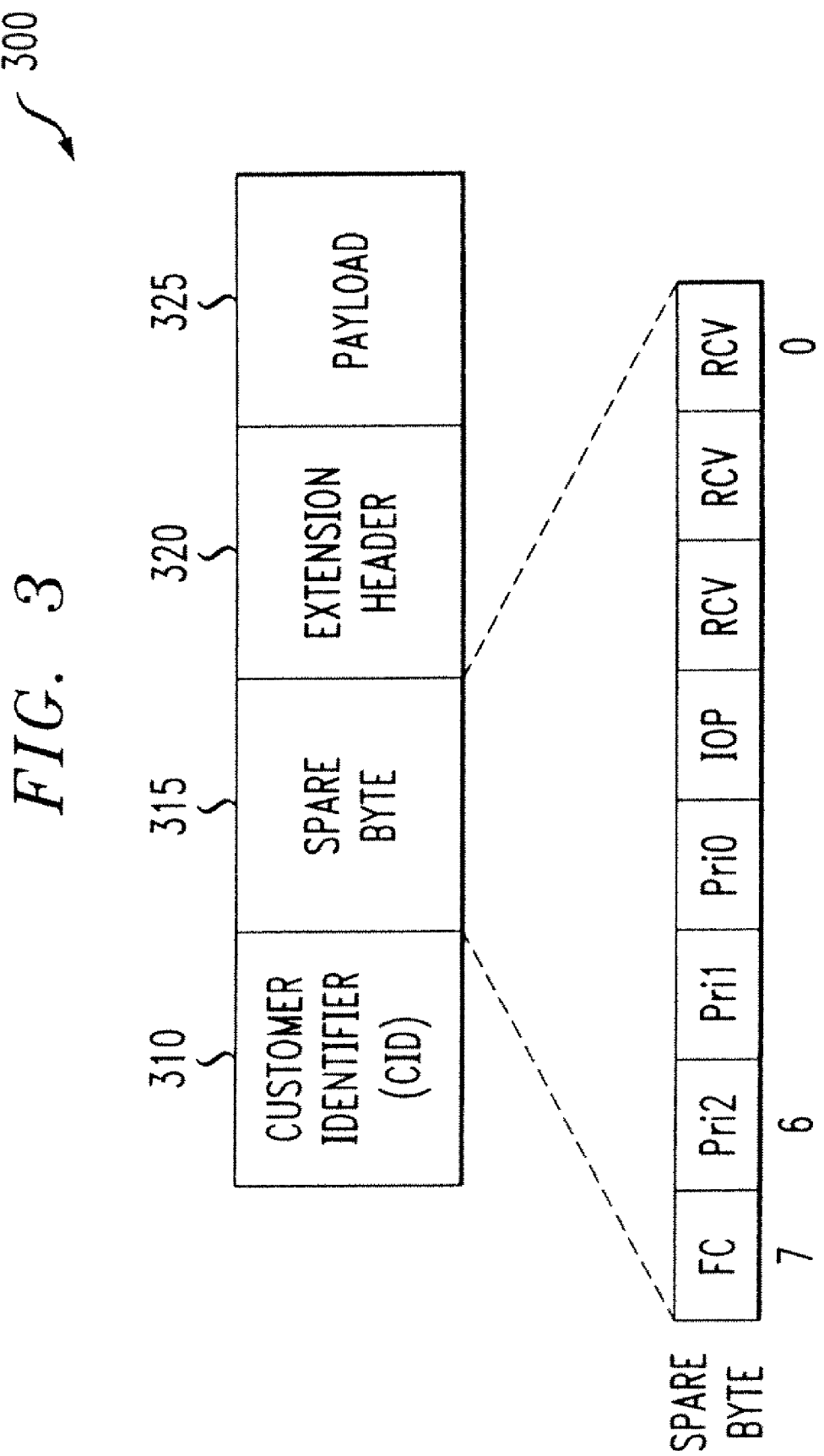

METHOD FOR PER-PORT FLOW CONTROL OF PACKETS AGGREGATED FROM MULTIPLE LOGICAL PORTS OVER A TRANSPORT LINK

CROSS-REFERENCE TO RELATED APPLICATIONS

This application is a continuation of U.S. patent application Ser. No. 10/285,221, filed Oct. 31, 2002, now abandoned incorporated by reference herein.

FIELD OF THE INVENTION

The present invention relates generally to flow control techniques for a communications network, and more particularly, to techniques for controlling the flow of packets aggregated from multiple logical ports over a transport link.

BACKGROUND OF THE INVENTION

Communication networks transfer information, such as data, voice, text or video information, among communication devices connected to the networks. Most enterprises employ local area networks (LANs), such as those based on the Ethernet protocol, to interconnect the various devices within the enterprise. Most LANs are connectionless, where frames are transmitted without error to a high degree of probability, but there is no guarantee of delivery. If a frame is not properly received, the receiving station will simply discard the frame without notifying the sender.

In addition, even when a frame is successfully transmitted, a frame can be lost due to buffer unavailability at the receiving station. If a receiving station is unable to receive and process data at a rate greater than or equal to the transmission rate of the transmitting station, the buffer at the receiving station can overflow. The loss of a frame due to buffer unavailability has the same effect as a frame that is lost due to a bit error. Thus, it is desirable to suspend or reduce the arrival of data packets rather than permit an overflow condition to occur at the buffer. A number of techniques have been proposed or suggested for flow control in LANs.

The IEEE 802.3x data communication protocol specifies a port-based flow control arrangement for full duplex Ethernet links based on a flow control message, such as a "pause" frame. A transmitting station that receives the pause frame enters a pause state in which the transmission of frames on the network is suspended for a specified time, thereby relieving congestion at the receiver. For a more detailed discussion of the pause function, see, for example, R. Seifert, Gigabit Ethernet: Technology and Applications for High-Speed LANs, 100-11 (1998), incorporated by reference herein. The pause function was contemplated for use by two end stations communicating over a dedicated full duplex Ethernet link. A pause frame includes a destination address in the form of a predefined multicast address. The use of a multicast address relieves the sender of a pause frame from having to know the specific address of the other device on the link.

A number of LANs are often connected in a larger network, such as a wide area network (WAN). While the Ethernet protocol is well suited to the LAN environment, the Ethernet protocol is not a viable option for WANs, primarily because the Ethernet collision avoidance mechanism limits the permissible distance of the furthest station and privacy issues related to separation of traffic over a transport network. Thus, in order to permit communication between LANs in an efficient, seamless and reliable manner, high-speed transport links between various LANs was needed.

In order to meet increased bandwidth demands, fiber optic systems, such as Synchronized Optical Networks (SONETs), are often employed as transport links in a WAN. Typically, a number of Ethernet packets from one or more source LANs are aggregated for transport over a SONET link to one or more destination LANs. If a station that is receiving packets from a remote transmitting station over a WAN link is unable to receive and process the packets at a rate greater than or equal to the transmission rate of the remote transmitting station, the buffer at the receiving station can overflow.

A port-based pause function based on the IEEE 802.3x data communication protocol has been proposed to control the flow of packets aggregated over a transport link. The multicast address of a pause frame, however, would cause the pause frame (if delivered at all) to be broadcast to all transmitting stations associated with the aggregated packets of a given flow. Thus, all such transmitting stations that receive the pause frame will suspend the transmission of frames even though only the buffer of one receiving station has a potential overflow condition. Thus, a need exists for an improved method for controlling the flow of packets aggregated from multiple logical ports over a transport link. A further need exists for a method for suspending the flow of only a single station that transmits packets over an aggregated transport link.

SUMMARY OF THE INVENTION

Generally, a method is disclosed for controlling the flow of packets aggregated from multiple logical ports over a transport link. According to one aspect of the invention, a per-port flow control indicator is provided to the transmitting end station that causes a potential congestion condition. The per-port flow control indicator may be, for example, a bit that is set to a predefined binary value in the linear expansion header of the Generic Framing Procedure (GFP) linear mapping scheme. The per-port flow control indicator causes the appropriate transmitting end station to suspend the transmission of further packets for a predefined minimum interval or until the transmitting end station is notified that the congestion condition has been remedied. Thus, the invention can provide a directed flow control indication to the end station that is the source of the congestion over the transport network without increasing the network overhead.

The per-port flow control indicator can be set upon congestion and carried in the opposite direction of the congestion across the transport network to inform the appropriate transmitting end station to stop sending packets. The flow control indicator can be set in one or more packets sent to the transmitting end station for a predefined minimum interval or until the transmitting end station is notified that the congestion condition has been remedied. If packets are not being sent to the appropriate transmitting end station that caused the congestion condition, a packet generator can generate one or more packets containing a GFP header with the flow control indicator set to inform the appropriate transmitting end station of the congestion condition.

A more complete understanding of the present invention, as well as further features and advantages of the present

BRIEF DESCRIPTION OF THE DRAWINGS

FIG. 3 illustrates a Generic Framing Procedure (GFP) linear expansion header that includes a flow control indicator in accordance with the present invention.

DETAILED DESCRIPTION

Figure 1:
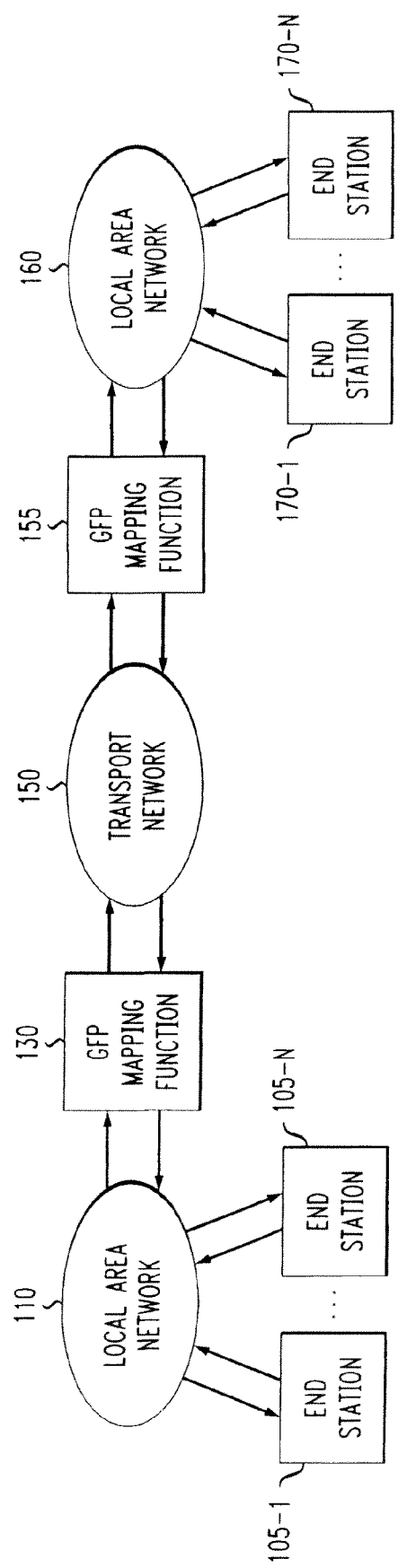
FIG. 1 illustrates a conventional technique for controlling the flow of packets aggregated between multiple end stations communicating over a transport network.

FIG. 1 illustrates a conventional technique for controlling the flow of packets between two local area networks 110, 160 communicating over a transport network 150, such as a SONET network, a Synchronous Digital Hierarchy (SDH) network or an Optical Transport Network (OTN). As shown in FIG. 1, a plurality of end stations 105-1 through 105-N connected to local area network 110 transmit packets that are aggregated for transport over a SONET link 150 to one or more end stations 170-1 through 170-N connected to local area network 160. The local area networks 110, 160 can be based, for example, on the Ethernet protocol, to interconnect the various end stations 105-1 through 105-N within an enterprise. The packets are aggregated and prepared for transport on the transport network 150 by a GFP mapping function gateway 130 employing the Generic Framing Procedure (GFP) linear mapping scheme. The GFP mapping function 130 assembles the asynchronous packets from the Ethernet-based local area network 110 into a constant bit rate stream, suitable for transport over the SONET network 150, in a known manner. Similarly, a GFP mapping function 155 converts the constant bit rate stream received on the SONET network 150 into asynchronous packets suitable for the Ethernet-based local area network 160.

The GFP mapping function 155 includes a buffer (not shown) for storing packets for each end station 170-n on the local area network 160. In addition, the GFP mapping function 155 includes a congestion detection mechanism that determines if a buffer threshold is exceeded. If the buffer threshold is exceeded, the GFP mapping function 155 will transmit a port-based pause frame on the end-to-end path across the SONET network 150 to each of the transmitting stations 105-1 through 105-N. As previously indicated, the multicast address of a pause frame (if delivered at all) causes the pause frame to be broadcast to all transmitting stations associated with the packets aggregated from multiple logical ports. Thus, all such transmitting stations 105-1 through 105-N that receive the pause frame will suspend the transmission of frames even though only the buffer associated with one receiving station has a potential overflow condition.

Figure 2:
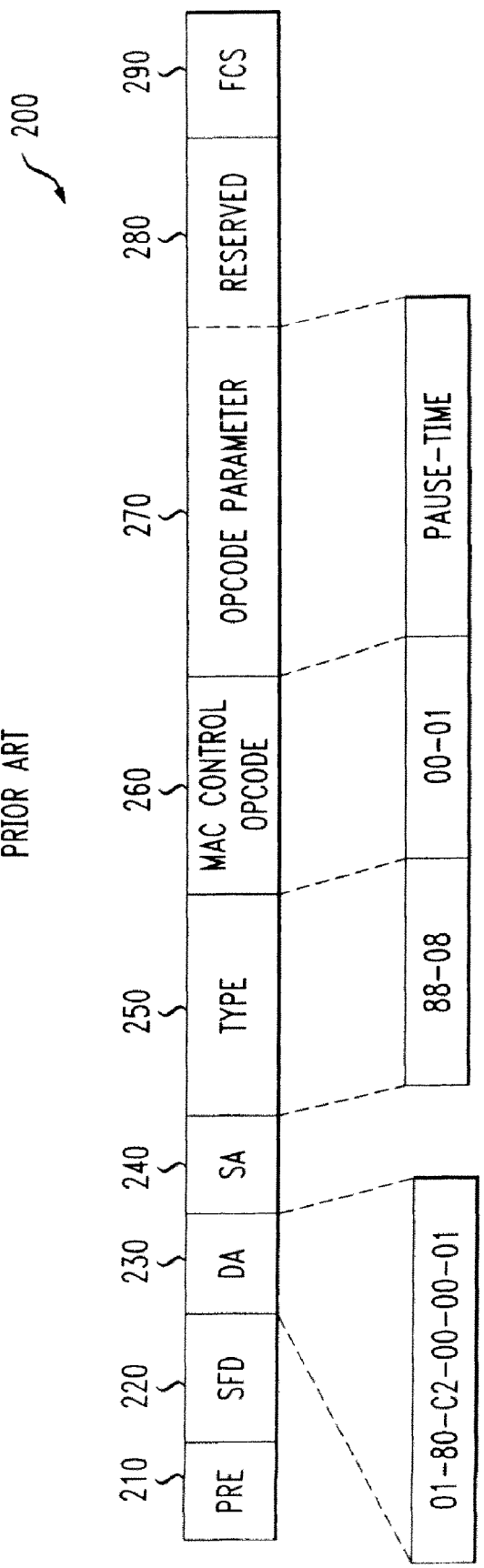
FIG. 2 illustrates a conventional pause frame in accordance with the flow control frame format of the IEEE 802.3 standard.

FIG. 2 illustrates the format for a conventional pause frame 200 in accordance with the flow control frame format of the IEEE 802.3 standard. As shown in FIG. 2, the MAC flow control frame format includes a preamble 210, a start-of-frame delimiter 220, a destination address 230, a source address 240, a type field 250, a MAC control opcode 260, a MAC control parameter 270, a reserved field 280 and a frame check sequence 290. In order to send a pause frame, the destination address 230 is populated with a predefined multicast address, 01-80-C2-00-00-01, the type field 250 is set to 88-08 indicating a MAC control frame, the MAC control opcode 260 is set to 00-01 indicating a pause frame and the MAC control parameter 270 is populated with the pause time.

The present invention provides a method for controlling the flow of packets aggregated from multiple logical ports that are transmitted over a transport link. As used herein, a logical port is a packet source or destination of traffic, where the traffic originates from a physical port, such as an Ethernet 10/100 port, or where the traffic originates from a fraction of the bandwidth of a physical port, such as on an Ethernet Virtual LAN (VLAN). Thus, the present invention controls the flow of packets aggregated from multiple logical port-based interfaces, such as a packet bus, as well as from multiple port-based interfaces, such as Ethernet LANs.

According to one aspect of the invention, the conventional GFP linear mapping scheme is enhanced with a flow control indicator that permits the flow of only a single station that transmits packets over an aggregated transport link to be suspended. In this manner, the present invention provides a directed flow control message to the transmitting end station 105-n causing the detected congestion condition. In one implementation, the flow control indicator is a bit in the GFP header of each packet that may be set in the opposite direction of a detected potential overflow condition to a predefined binary value to indicate a potential overload condition. Thus, another aspect of the invention can provide the flow control indication to the offending end station as part of the data flow sent across the transport network. As discussed further below, the flow control indicator is mapped by the GFP mapping function 130, 155 associated with the offending transmitting end station 105-n to a port-based pause frame that is sent only to the offending transmitting end station 105-n (identified by the customer identifier 310).

While the present invention is illustrated herein in the context of an exemplary SONET network 150 that transports aggregated Ethernet packets, the present invention may be employed in any optical transport network that maps asynchronous packets to a constant bit rate stream, for example, using the Generic Framing Procedure (GFP) linear mapping scheme.

FIG. 3 illustrates a GFP linear expansion header 300 in accordance with the present invention that is associated with each encapsulated packet in the aggregated network environment of FIG. 1. Generally, all Ethernet packets are encapsulated within the GFP layer that is transmitted across the SONET network 150. A GFP linear expansion header 300 is placed on each packet. As shown in FIG. 3, the GFP linear expansion header 300 includes a customer identifier (CID) 310 to identify the end station 105-n that generated the packet, a spare byte 315, discussed below, an extension header 320 and a payload 325, which is the Ethernet packet(s) to be transmitted.

As shown in FIG. 3, the spare byte 315 includes a flow control (FC) bit in an exemplary embodiment of the present invention that may be set to a predefined binary value to indicate a potential overflow condition. The flow control indicator is set by the GFP mapping function 130, 155 that detects the congestion condition and is mapped at the GFP termination point to a per client service flow control indication in the opposite direction of the detected potential overflow condition. In other words, the GFP mapping function 130, 155 associated with the offending transmitting end station 105-n will receive a packet with the flow control indicator set and will send a pause frame only to the offending transmitting end station 105-n (identified by the customer identifier 310) in accordance with the Ethernet standard. Since the flow control indicator is part of the GFP linear header 300, the flow control mechanism can be applied on a per customer or end station basis.

While the exemplary GFP mapping functions 130, 155 described herein provide a port-based interface to translate the flow control indicator to a port-based pause frame that is sent to an Ethernet end station 105-n, the GFP mapping functions 130, 155 could also provide a logical port-based interface to translate the flow control indicator to a logical channel, such as those associated with an SPI-3 packet bus, defined by the Optical Internetworking Forum (OIF), for transmitting packets over a SONET bus.

Thus, for aggregated links, the flow control indicator of the present invention can be set upon congestion and carried across the SONET network 150 to inform the transmitting end station 105-n to stop sending packets. In one implementation, the flow control indicator is set in every packet associated with the transmitting end station 105-n for a predefined minimum interval or until the transmitting end station 105-n is notified that the congestion condition has been remedied. Thus, any failure to deliver the first flow control indicator (for example, due to a lost or corrupted packet) would be resolved by subsequent packets since they also contain the flow control indicator. For example, the flow control indicator can be set to a first binary value in every packet generated when a congestion condition is present and to a second binary value in every packet when a congestion condition is not present. In a further variation, a flow control indicator in a received packet can start a timer indicating a predefined time interval for which the offending end station 105-n should suspend transmission. Of course, a number of variations exist, including the use of coded messages over a plurality of frames, as would be apparent to a person of ordinary skill in the art.

If packets are not already being sent to the transmitting end station 105-n that caused the congestion condition, and therefore a flow control indicator cannot be relayed to the source of the congestion, a packet generator can generate a packet containing a GFP header with the flow control indicator set. In this manner, the transmitting end station 105-n that caused the congestion condition is informed of the congestion condition.

In order to provide lossless service, the GFP mapping functions 130, 155 should include buffers that are capable of storing packets between the detection of a congestion condition and the time when the transmitting end station 105-n reacts and suspends transmission of further packets. Generally, a congestion condition is detected when a buffer level exceeds a predefined maximum level. Likewise, a congestion condition is typically remedied when the buffer level falls to a predefined minimum level. In a further variation, a congestion condition can be detected by a receiving end station 170-n, and a port-based pause frame can be sent from the LAN 160 to the GFP mapping function 155. The GFP mapping function 155 maps the port-based pause frame to a flow control indicator in the GFP linear expansion header 300 for transmission across the transport network to the offending end station 105-n in accordance with the present invention.

It is to be understood that the embodiments and variations shown and described herein are merely illustrative of the principles of this invention and that various modifications may be implemented by those skilled in the art without departing from the scope and spirit of the invention.

We claim:

1. A method for controlling a flow of packets aggregated from a plurality of logical ports for transmission over a transport network to one or more destinations, said method comprising the steps of:

detecting a potential overflow condition in a buffer that stores packets for at least one of said one or more destinations, wherein said packets include an identifier of a logical port associated with a source of said packet and a per-port directed flow control indicator associated with said identifier; and providing said per-port directed flow control indicator to each logical port that is a source of said potential overflow condition.

2. The method of claim 1, wherein said per-port directed flow control indicator is included in a header of a packet being sent to said one of said logical ports that is a source of said potential overflow condition.

3. The method of claim 1, wherein said per-port directed flow control indicator is a bit that is set in a header of a packet being sent to said one of said logical ports that is a source of said potential overflow condition.

4. The method of claim 3, wherein said per-port directed flow control indicator is a bit that is set in a header of each packet being sent to said one of said logical ports that is a source of said potential overflow condition for a predefined interval.

5. The method of claim 3, wherein said per-port directed flow control indicator is a bit that is set in a header of each packet being sent to said one of said logical ports that is a source of said potential overflow condition until said potential overflow condition is relieved.

6. The method of claim 3, wherein said per-port directed flow control indicator is a bit that is set to a predefined binary value in a linear expansion header of the Generic Framing Procedure (GFP) linear mapping scheme to indicate a potential overflow condition.

7. The method of claim 1, wherein said detecting step further comprises the step of monitoring a maximum buffer level threshold.

8. The method of claim 1, wherein said detecting step is performed by a GFP mapping function that maps between a constant bit stream on said transport network and asynchronous packets for delivery to said one or more destinations.

9. The method of claim 1, wherein said per-port directed flow control indicator causes said logical port that is a source of said potential overflow condition to suspend transmission of further packets for a predefined minimum interval.

10. The method of claim 1, wherein said per-port directed flow control indicator causes said logical port that is a source of said potential overflow condition to suspend transmission of further packets until notification that said potential overflow condition has been remedied.

11. The method of claim 1, wherein said per-port directed flow control indicator is mapped to a port-based pause indicator before being provided to said logical port that is a source of said potential overflow condition.

12. The method of claim 1, wherein said per-port directed flow control indicator is mapped to a logical port-based pause indicator before being provided to said logical port that is a source of said potential overflow condition.

13. A flow control method performed by a gateway that aggregates packets from a first logical port with packet flows from, additional logical ports for transmission over a transport network, said method comprising the steps of:

receiving a packet having a per-port directed flow control indicator over said transport network, wherein said packet includes an identifier of said first logical port that is a source of said packet and wherein said per-port directed flow control indicator indicates that said first logical port is a source of a potential overflow condition; and notifying said first logical port that said first logical port is a source of said potential overflow condition.

14. The method of claim 13, wherein said first logical port is an Ethernet port and said notifying step further comprises the step of generating a port-based pause frame that is sent to said Ethernet port.

15. The method of claim 13, wherein said first logical port is a logical channel and said notifying step further comprises the step of generating a logical port-based pause indicator that is provided to said logical channel.

16. The method of claim 13, wherein said per-port directed flow control indicator is included in a header of a packet being sent to said first logical port that is a source of said potential overflow condition.

17. The method of claim 13, wherein said per-port directed flow control indicator is a bit that is set in a header of a packet being sent to said first logical port that is a source of said potential overflow condition.

18. The method of claim 13, wherein said per-port directed flow control indicator causes said first logical port to suspend transmission of further packets for a predefined minimum interval.

19. The method of claim 13, wherein said per-port directed flow control indicator causes said first logical port to suspend transmission of further packets until a notification that said potential overflow condition has been remedied.

* * * * *